US012033840B2

(12) United States Patent
Worthington et al.

(10) Patent No.: US 12,033,840 B2
(45) Date of Patent: Jul. 9, 2024

(54) TRANSFORMER FOR APPLYING AN AC VOLTAGE TO ELECTRODES

(71) Applicant: Micromass UK Limited, Wilmslow (GB)

(72) Inventors: Kenneth Worthington, Middlewich (GB); Martin Raymond Green, Bowdon (GB)

(73) Assignee: Micromass UK Limited, Wilmslow (GB)

( * ) Notice: Subject to any disclaimer, the term of this patent is extended or adjusted under 35 U.S.C. 154(b) by 395 days.

(21) Appl. No.: 17/436,213

(22) PCT Filed: Feb. 27, 2020

(86) PCT No.: PCT/GB2020/050466
§ 371 (c)(1),
(2) Date: Sep. 3, 2021

(87) PCT Pub. No.: WO2020/178556
PCT Pub. Date: Sep. 10, 2020

(65) Prior Publication Data

US 2022/0130655 A1 Apr. 28, 2022

(30) Foreign Application Priority Data

Mar. 4, 2019 (GB) ..................................... 1902884

(51) Int. Cl.
*H01J 49/02* (2006.01)
*H01F 27/28* (2006.01)
(Continued)

(52) U.S. Cl.
CPC ........ *H01J 49/022* (2013.01); *H01F 27/2823* (2013.01); *H01F 30/16* (2013.01);
(Continued)

(58) Field of Classification Search
CPC .. H01J 49/022; H01J 49/4215; H01J 49/4225; H01J 49/424; H01F 27/2823; H01F 30/16
(Continued)

(56) References Cited

U.S. PATENT DOCUMENTS 4,713,347 A * 12/1987 Mitchell ............ G01N 33/5302
435/6.12
5,354,988 A 10/1994 Jullien
(Continued)

FOREIGN PATENT DOCUMENTS

CN 102171783 A 8/2011
CN 104517798 A 4/2015
(Continued)

OTHER PUBLICATIONS

Search and Examination Report under Sections 17 and 18(3) for Application No. GB2002770.2, dated Sep. 1, 2021, 5 pages.
(Continued)

*Primary Examiner* — Nicole M Ippolito
(74) *Attorney, Agent, or Firm* — Goodwin Procter LLP

(57) ABSTRACT

An ion-optical device comprising: a plurality of electrodes (2); a first AC voltage supply (6); and a transformer (4) having: a toroidal core (8); a primary winding (10) connected to the AC voltage supply (6) and passing through the aperture within the toroidal core (8); and at least one secondary winding (13,15) wound around the toroidal core 8 and electrically connected to multiple ones of said plurality of electrodes.

18 Claims, 2 Drawing Sheets

(51) Int. Cl.
*H01F 30/16* (2006.01)
*H01J 49/42* (2006.01)

(52) U.S. Cl.
CPC ....... *H01J 49/4215* (2013.01); *H01J 49/4225* (2013.01); *H01J 49/424* (2013.01)

(58) Field of Classification Search
USPC .......................................... 250/281, 282, 283
See application file for complete search history.

(56) References Cited

U.S. PATENT DOCUMENTS

| | | | |
|---|---|---|---|
| 7,161,142 | B1 | 1/2007 | Patterson et al. |
| 2005/0269500 | A1 | 12/2005 | Potvin et al. |
| 2011/0012013 | A1 | 1/2011 | Remes et al. |
| 2016/0181076 | A1 | 6/2016 | Smith |
| 2018/0323008 | A1 | 11/2018 | Dong et al. |

FOREIGN PATENT DOCUMENTS

| | | | |
|---|---|---|---|
| CN | 108878118 | A | 11/2018 |
| EP | 3370248 | A1 | 9/2018 |
| GB | 794225 | A | 4/1958 |
| JP | S61140049 | A | 6/1986 |
| JP | S63128545 | A | 6/1988 |
| JP | H107240170 | A | 9/1995 |
| WO | 2003067627 | A1 | 8/2003 |
| WO | 2005124821 | A2 | 12/2005 |
| WO | 2015/101819 | A1 | 7/2015 |

OTHER PUBLICATIONS

International Search Report and Written Opinion for International Application No. PCT/GB2020/050466, dated Jul. 3, 2020.
Combined Search and Examination Report for GB Application No. GB1902884.4, dated Jul. 31, 2019.
Combined Search and Examination Report for GB Application No. GB2002770.2, dated Dec. 1, 2020.

* cited by examiner

TRANSFORMER FOR APPLYING AN AC VOLTAGE TO ELECTRODES

CROSS-REFERENCE TO RELATED APPLICATIONS

This application is a U.S. national phase filing claiming the benefit of and priority to International Patent Application No. PCT/GB2020/050466, filed Feb. 27, 2020, which claims priority from and the benefit of United Kingdom patent application No. 1902884.4 filed on Mar. 4, 2019. The entire contents of these applications are incorporated herein by reference.

FIELD OF THE INVENTION

The present invention relates generally to a transformer for applying an AC voltage to a plurality of electrodes in an ion-optical device. The AC voltage may be applied, for example, in order to excite ions or correct for distortions in an electric field that is generated by the electrodes. Such distortions in the electric field may be caused, for example, by imperfections in the electrodes or the voltage supplies that supply those electrodes.

BACKGROUND

A typical quadrupole mass analyser has four rod electrodes that are arranged in a square array and with their axes parallel to each other. A first set of diametrically opposite electrodes are electrically connected together so as to form a first pair of electrodes and the remaining two diametrically opposite electrodes are electrically connected together so as to form a second pair of electrodes. A high voltage RF signal in the region of 100 kHz to 3000 KHz (e.g. approximately 1 MHz) is typically applied between the pairs of electrodes. A DC offset voltage is also applied between the pairs of electrodes. Ions are passed into the entrance end of the quadrupole mass analyser and pass along it between the rod electrodes, but only ions of a certain mass-to-charge ratio will reach the end of the rod set, as the other ions have unstable trajectories and collide with the rod electrodes. The voltages applied to the quadrupole rod set may be selected such that only desired ions are transmitted. The quadrupole mass analyser therefore acts as a mass filter.

In addition to the main RF voltage mentioned above, it is known to apply another AC voltage differentially between either (or both) pair of diametrically opposite rod electrodes in order to enhance the analytical performance of the device. However, in practice, it is difficult to apply this additional voltage due to the presence of the main RF voltage required for the quadrupole operation.

SUMMARY

From a first aspect the present invention provides an ion-optical device comprising: a plurality of electrodes; a first AC voltage supply; and a first transformer having: a toroidal core; a primary winding connected to the AC voltage supply and passing through the aperture within the toroidal core; and at least one secondary winding wound around the toroidal core and electrically connected to multiple ones of said plurality of electrodes.

The AC voltage supply supplies an AC voltage to the primary winding, which then induces a voltage in the at least one secondary winding. The secondary winding then supplies that induced voltage to the electrodes to which it is connected.

This may be used to balance or adjust another AC or RF voltage applied to the electrodes, for example to counteract imperfect electric fields produced by those AC or RF voltages. Alternatively, the first AC voltage supply may be used to add an AC (e.g. dipole) excitation waveform to the electrodes to excite and/or eject ions. The AC excitation waveform may be applied in addition to another AC or RF voltage and may have a different frequency and/or phase to said another AC or RF voltage. This excitation waveform may be used, for example, to mass selectively excite ions in the ion-optical device.

The configuration of the transformer disclosed herein enables its impact on other circuits in the ion-optical device, such as RF circuits, to be minimised.

The primary winding may not be wound around the toroidal core. For example, the primary winding may comprise a substantially straight portion passing along an axis (e.g. central axis) through the aperture in the toroidal core.

The substantially straight portion of the primary winding may be a rigid conductor.

The plurality of electrodes may be arranged to define a region for guiding and/or trapping ions.

The toroidal core may be a ferrite core.

The device may comprise an electrical insulator arranged within the aperture of the toroidal core in the space between the primary and secondary windings.

The insulator may have an elongated tubular shape, such as a cylindrical shape.

The insulator may extend outwards from either side of the toroidal core.

The radially outer surface of the insulator may physically contact the radially inner sides of the secondary windings; and/or the outer surface of the primary winding may be in physical contact with the inner surface of the insulator. This eliminates gaps or voids which may otherwise result in partial electrical discharges (i.e. electrical breakdown) from the secondary and/or primary windings.

The radially outer surface of the insulator may form an interference fit with the radially inner surface of the secondary windings; and/or the radially inner surface of the insulator may form an interference fit with the radially outer surface of the primary winding.

The insulator may be formed of a pliable material so that the radially outer surface of the insulator moves and conforms to the radially inner surface of the secondary windings; and/or so that the radially inner surface of the insulator moves and conforms to the radially outer surface of the primary winding.

The insulator may be formed from PTFE.

The primary winding may pass along the central axis of the insulator.

The primary winding may comprise an electrically conductive rod member in the region that passes through the aperture in the toroid. The rod member may act as a mechanical support for the transformer.

The primary winding comprises a conductor that may be coated with an electrically insulated coating, wherein the coating may be separate to the insulator described above.

The at least one secondary winding comprises a conductor that may be coated with an electrically insulated coating, wherein the coating is separate to the insulator described above.

The device may comprise a second AC voltage supply for supplying a second AC voltage to said plurality of electrodes.

The second AC voltage may act to confine ions within the ion-optical device.

The second AC voltage may be an RF voltage.

The second AC voltage supply may supply the second AC voltage to the electrodes that are connected to the at least one secondary winding and/or to other electrodes of said plurality of electrodes.

The first AC voltage supply may be configured to apply a first AC voltage to the primary winding that is phase locked with the second AC voltage.

The plurality of electrodes may comprise a quadrupole or other multipole rod set of electrodes, and different ends of the secondary winding may be connected to different electrodes of a first pair of opposing rod electrodes.

The second AC voltage supply may apply the second AC voltage between the first pair of electrodes and another pair of electrodes in the rod set.

The device may comprise a DC voltage supply for applying a DC voltage between the first pair of electrodes and said another pair of electrodes in the rod set.

The ion optical device may be a quadrupole mass analyser, quadrupole mass filter, 3D ion trap, or linear ion trap.

The at least one secondary winding may comprises two wires that have together been bi-filar wound around the toroidal core from starting ends of the wires to finishing ends of the wires; wherein the starting end of a first of the wires is connected to one of said plurality of electrodes and the finishing end of a second of the wires is connected to another of said plurality of electrodes; wherein the finishing end of the first wire is connected to the starting end of the second wire, thereby forming a single centre tapped secondary winding; and wherein a second AC voltage supply is connected between the centre tap of the secondary winding and electrodes of said plurality of electrodes, for supplying a second AC or RF voltage between said single centre tapped secondary winding and the electrodes.

As described above, the plurality of electrodes may comprise a quadrupole or other multipole rod set, and the starting end of the first wire may be connected to a first rod electrode in a pair of opposing rod electrodes and the finishing end of the second wire maybe connected to the other rod electrode in the pair of opposing rod electrodes.

A DC voltage supply maybe connected between the centre tap of the secondary winding and electrodes of said plurality of electrodes, for supplying a DC voltage to said single centre tapped secondary winding and to the electrodes.

The length of the first wire between its starting end and the toroidal core may be the same as the length of the second wire between its finishing end and the toroidal core.

This allows the impedances feeding the electrodes to be equally matched, and net current cancellation to occur. This may ensure that the magnetic field induced within the toroidal core is small, and does not create a significant power loss within RF circuits.

The device may comprise an ion detector arranged to receive ions guided by the plurality of electrodes and a voltage controller configured to adjust the AC voltage applied to the primary winding by the first AC voltage supply based on the ion signal detected at the ion detector.

For example, the voltage controller may adjust the AC voltage applied to the primary winding based on an ion peak shape, a mass resolution or ion transmission characteristic detected by the detector.

The voltage controller may automatically adjust the AC voltage applied to the primary winding based on the ion signal detected at the ion detector until the ion signal is improved or optimised.

The voltage controller may adjust the AC voltage until the peak shape, mass resolution or transmission characteristic meet one or more predetermined threshold criteria, or until it is optimised.

The first AC voltage supply may be configured to sum one AC voltage with another AC voltage and then apply the summed voltage to the primary winding; and the voltage controller may be configured to adjust the AC voltage applied to the primary winding by varying the phase and/or amplitude of said another voltage.

The voltage controller may comprise a phase shifter and/or amplifier for varying the phase and/or amplitude of said another voltage, respectively.

The device may comprise a second transformer having: a toroidal core; a primary winding connected to an AC voltage supply and passing through the aperture within the toroidal core; and at least one secondary winding wound around the toroidal core and connected to electrodes in said plurality of electrodes other than those connected to the windings of the first transformer. The second transformer may have any of the features described above in relation to the other transformer.

If the plurality of electrodes comprises a quadrupole rod set, or other multiple rod set, the secondary winding in the first transformer may be connected to a first pair of rod sets and the secondary winding in the second transformer may be connected to a different pair of rod sets.

The concept of controlling the AC voltage applied to the primary winding based on the ion signal detected at the ion detector is considered to be new it its own right.

As such, from a second aspect the present invention provides an ion-optical device comprising: a plurality of electrodes; a first AC voltage supply; a transformer having a core, a primary winding, and at least one secondary winding; an ion detector arranged to receive ions guided by the plurality of electrodes; and a voltage controller configured to adjust the AC voltage applied to the primary winding by the first AC voltage supply based on the ion signal detected at the ion detector.

The transformer may be of the form described herein above.

The voltage controller may adjust the AC voltage applied to the primary winding based on an ion peak shape, a mass resolution or ion transmission characteristic detected by the detector.

The voltage controller may automatically adjust the AC voltage applied to the primary winding based on the ion signal detected at the ion detector until the ion signal is improved or optimised.

The voltage controller may adjust the AC voltage until the peak shape, mass resolution or transmission characteristic meet one or more predetermined threshold criteria, or until it is optimised.

The first AC voltage supply may be configured to sum one AC voltage with another AC voltage and then apply the summed voltage to the primary winding. The voltage controller may be configured to adjust the AC voltage applied to the primary winding by varying the phase and/or amplitude of said another voltage.

The voltage controller may comprise a phase shifter and/or amplifier for varying the phase and/or amplitude of said another voltage, respectively.

The transformer described herein is itself considered to be new it its own right.

As such, the present invention provides a transformer for applying a voltage to electrodes of an ion optical device or to an electrical circuit, the transformer comprising: a toroidal core; a primary winding for connection to an AC voltage supply and passing through the aperture within the toroidal core; and at least one secondary winding wound around the toroidal core for connection to the electrodes.

The transformer may comprise any of the features described hereinabove in relation to the first aspect.

For example, the primary winding may not be wound around the toroidal core.

The transformer may comprise an electrical insulator as described herein above.

The insulator may extend outwards from either side of the toroidal core.

The primary winding may comprise a substantially straight portion passing along a central axis of the aperture in the toroidal core.

The electrical insulator may be arranged within the aperture of the toroidal core in the space between the primary winding and the secondary windings.

The transformer may comprise an insulator arranged within the aperture of the toroidal core in the space between the primary and secondary windings, wherein the radially outer surface of the insulator physically contacts the radially inner sides of the secondary windings.

The outer surface of the primary winding may be in physical contact with the inner surface of the insulator.

The at least one secondary winding may comprise two wires that have together been bi-filar wound around the toroidal core from starting ends of the wires to finishing ends of the wires; wherein the finishing end of the first wire is connected to the starting end of the second wire, thereby forming a single centre tapped secondary winding.

As described above, the transformer may power a circuit, such as one that is electrically floated at an RF and/or DC voltage, with respect to ground. The transformer described herein may be used to supply power to the circuit, for example, by: supplying the primary winding of the transformer with an AC voltage (within the frequency range of the transformer); rectifying the resulting secondary AC voltage generated at the secondary winding of the transformer; and providing the rectified voltage to power supply rails of the circuit so as to power the circuit.

The present invention also provides an assembly comprising the transformer and the AC voltage supply for connection to the primary winding.

The present invention also provides a mass spectrometer comprising an ion optical device or transformer as described herein.

The mass spectrometer may comprise a vacuum chamber, and said plurality of electrodes of the ion-optical device and/or the transformer may be arranged within the vacuum chamber.

The first aspect of the present invention also provides a method of mass spectrometry comprising providing an ion-optical device as described herein above. The first AC voltage supply may supply the AC voltage to the primary winding, which may then induce a voltage on the at least one secondary winding that is wound around the toroidal core. The at least one secondary winding may then apply the induced voltage to said plurality of electrodes of the ion-optical device. Ions may be guided through, trapped by or radially excited by the plurality of electrodes.

The second aspect of the present invention also provides a method of mass spectrometry comprising providing an ion-optical device as described herein above. Ions may be guided by the plurality of electrodes onto the ion detector. The voltage controller may automatically adjust the AC voltage applied to the primary winding by the first AC voltage supply based on the ion signal detected at the ion detector.

Embodiments of the invention described herein use a novel transformer to add differential voltages between opposite rod electrodes of a quadrupole analyser, whilst minimising the impact on the existing RF circuit of the analyser. The voltages may be added to correct for relatively small mechanical differences in the symmetry between the rod electrodes (and/or to correct for the electrical connections between the rods and RF source being different lengths), that would otherwise create artefacts and distortions in the mass peaks detected.

The embodiments may negate any remaining imbalance in the electric field, for example, due to the transformer, connections and mechanical symmetry, by adjusting the AC voltage applied to the electrodes.

BRIEF DESCRIPTION OF THE DRAWINGS

Various embodiments will now be described, by way of example only, and with reference to the accompanying drawings in which.

DETAILED DESCRIPTION

Figure 1A:
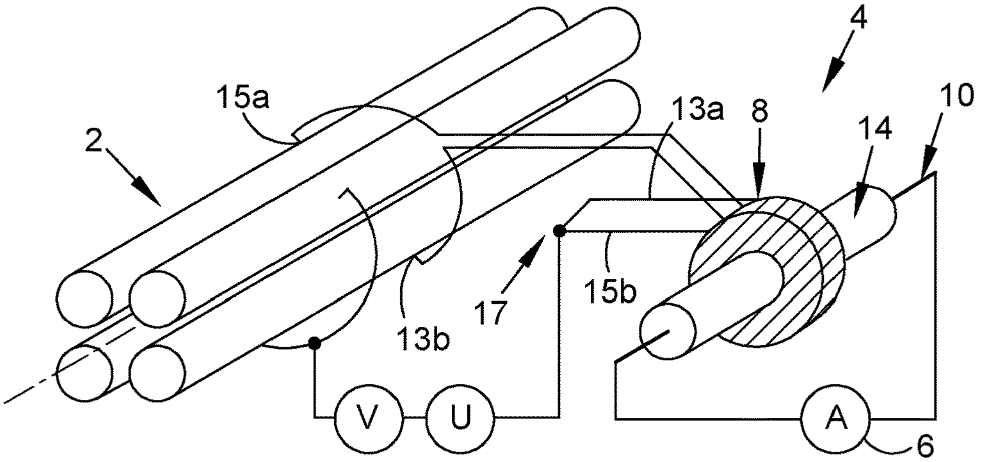
FIG. 1A shows a perspective view of a quadrupole mass analyser according to an embodiment of the present invention.
Figure 1B:
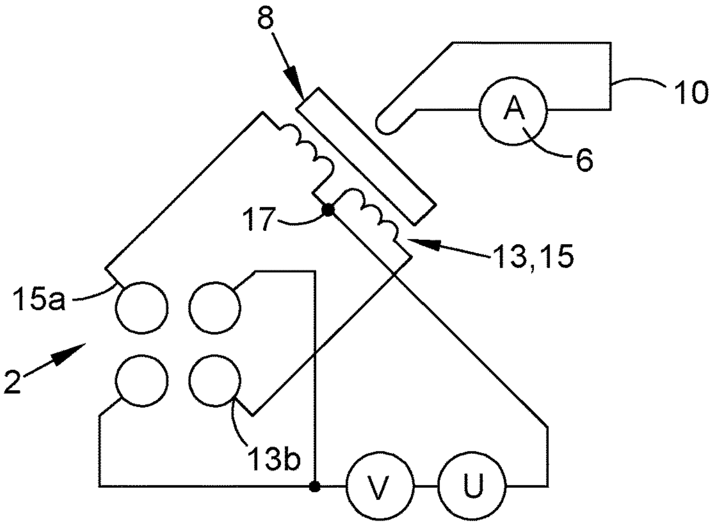
FIG. 1B shows an electrical schematic of the same embodiment.

FIG. 1A shows a schematic, perspective view of a quadrupole mass analyser according to an embodiment of the present invention. FIG. 1B shows an electrical schematic of the same embodiment. The device comprises a quadrupole rod set 2 of electrodes that are arranged in a square array. In the depicted embodiment the axes of the electrodes are parallel to each other, although it is contemplated that their longitudinal axes may be angled relative to each other. A first set of diametrically opposite rod electrodes are electrically connected together so as to a first pair of electrodes, and the remaining two diametrically opposite electrodes are electrically connected together so as to a second pair of electrodes. One terminal of a (main) RF voltage supply V is connected to the first pair of electrodes and another terminal of the RF voltage supply V is connected to the second pair of electrodes, such that an RF voltage is applied between the pairs of electrodes. The RF voltage may be applied such that the first pair of electrodes is maintained at the opposite phase of the RF signal to the second pair of electrodes. The RF voltage supply may provide an RF voltage with a frequency in the range of, for example, 100 kHz to 3000 KHz. A DC offset voltage is also applied between the pairs of electrodes. One terminal of a DC voltage supply U is connected to the first pair of electrodes and another terminal of the DC voltage supply U is connected to the second pair of electrodes, such that the DC voltage is applied between the pairs electrodes.

In use, ions are passed into the entrance end of the quadrupole rod set and are transmitted in a direction along the longitudinal axis thereof, between the electrodes. As the ions travel, they oscillate radially due to the voltages applied to the electrodes. For any given combination of RF and DC voltages applied to the electrodes, only ions of a certain mass-to-charge ratio, or range of mass to charge ratios, are radially confined by the electrodes and so only these ions will reach the exit end of the rod set. The other ions have radially unstable trajectories and so collide with the rod electrodes and are filtered out by the device. The RF and DC voltages applied to the quadrupole rod electrodes may therefore be selected such that only ions of desired mass to charge ratios are transmitted out of the exit of the rod set. These voltages may be scanned or otherwise varied with time such that ions of different mass to charge ratios are able to be transmitted at different times. An ion detector may be arranged downstream of the quadrupole rod set to detect ions that are transmitted by the quadrupole rod set. If ions are detected, the mass analyser may determine the RF and DC voltages that were applied to the quadrupole rod set at the time that these ions were transmitted. As these voltages determine the mass to charge ratios that are able to be transmitted by the quadrupole rod set, the mass analyser may use them to determine the mass to charge ratio(s) of the ions detected.

The device also comprises a transformer 4 for receiving an AC voltage from an AC voltage source 6 and transforming it to an auxiliary AC voltage that is applied between the electrodes. The transformer 4 comprises a toroidal core 8, such as a ferrite core, a primary winding 10 passing through the aperture of the core 8, two secondary winding portions wound around the core (described in more detail in relation to FIG. 2), and an electrical insulator 14 filling the space within the toroidal core 8 around the primary winding 10. The toroidal core 8 may have an outer diameter of, for example, 17 mm. As will be appreciated, the AC voltage source 6 supplies a voltage to the primary winding 10 of the transformer 4, and the transformer transforms this voltage to the auxiliary voltage that is applied to the rod electrodes. The ratio of the number of turns in a primary winding 10 to the number of turns in a secondary winding determines the auxiliary voltage supplied to the rod electrodes by the transformer 4. The primary winding 10 may be formed of only a single turn or multiple turns.

Figure 2:
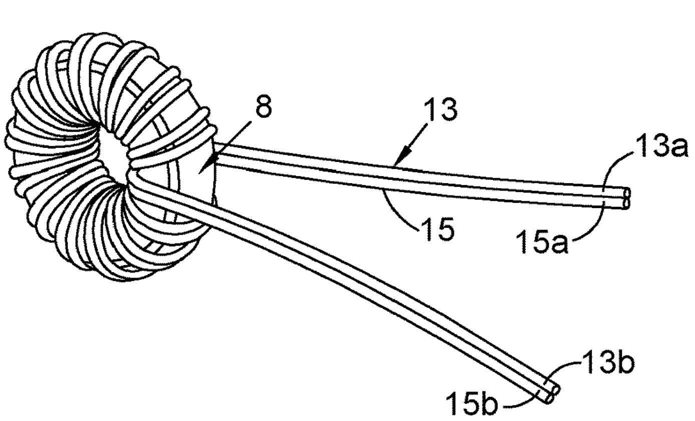
FIG. 2 shows a transformer toroidal core having secondary windings wound around it, according to an embodiment.

FIG. 2 shows a schematic of the toroidal core 8 with the secondary winding portions shown wound around it. The secondary winding portions may be bi-filar wound around the toroidal core 8. In other words, two different wires 13,15 having electrically insulating coatings may be would together around the core 8, e.g. so that the individual turns of the wires are interleaved in a circumferential direction around the toroidal core 8. The wires 13,15 are wound by passing the wires in a first direction through the aperture in the core, winding them around the radially outer side of the core 8, and then passing the wires back through the aperture in the core in the first direction. This process may be continued until the wires 13,15 are evenly wound around the core (in a circumferential direction). In other words, the wires 13,15 may be considered to be wound around any given sector portion of the toroidal core. The wires 13,15 may be wound such that the starting ends 13*a*,15*a* of both wires are located adjacent each other and the finishing ends 13*b*,15*b* of both wires are located adjacent each other.

Referring back to FIG. 1A, the starting end 13*a* of a first of the wires 13 and the finishing end 15*b* of the second of the wires 15 may be connected together, thereby forming a single centre tapped secondary winding. The centre tap 17 is connected to one side of the RF voltage supply V and DC voltage supply U. The finishing end 13*b* of the first wire 13 is connected to a first of the rod electrodes in of the electrode pairs, and the starting end 15*a* of the second wire 15 is connected to the other rod electrode in that electrode pair. The length of the first wire 13 between its finishing end 13*b* (that is connected to the first of the rod electrodes) and the toroidal core 8 may be the same as the length of the second wire 15 between its starting end 15*a* (that is connected to the other rod electrode in that electrode pair) and the toroidal core 8. This allows the impedances feeding the quadrupole rod electrodes to be equally matched, and net current RF cancellation to occur between the two closely coupled windings. This ensures that the magnetic field induced within the toroidal core 8 is small, and does not create a significant power loss within the RF circuit.

The primary and secondary windings are sufficiently electrically separated by the insulator 14 to achieve electrical isolation between the circuit of the primary winding 10 and the circuits of the secondary windings 13,15. The dielectric constant, and dielectric loss, of the insulator 14 may be low enough to avoid significant loading of the RF (or DC) circuit, due to either increased capacitance or power dissipation. For example, the capacitance between the primary and secondary windings may be approximately 2 pF.

The insulator 14 is located radially inside the aperture through the toroidal core 8 and inwards of the secondary windings 13,15. The insulator 14 may have an elongated tubular shape, such as a cylindrical shape. The insulator 14 may extend outwards from either side of the toroidal core 8, optionally so as to providing sufficient creepage (or tracking) distance to withstand the RF and DC voltages. The radially outer surface of the insulator 14 may physically contact the radially inner sides of the windings 13,15 so as to avoid gaps or voids therebetween, which may otherwise result in partial electrical discharges (i.e. electrical breakdown) due to the RF voltage. The insulator 14 may be formed of a relatively pliable material, such as PTFE, so that the radially outer surface of the insulator 14 moves and conforms to the radially inner surface of the windings 13,15. The radially outer surface of the insulator 14 may form an interference fit with the radially inner surface of the windings 13,15.

As described above, the primary winding 10 is located within the insulator 14 at least in the region that it passes through the aperture in the toroidal core 8. The primary winding 10 may pass along the central axis of the insulator 14. The outer surface of the primary winding 10 may be in physical contact with the inner surface of the insulator 14 so as to prevent partial electrical discharge from the primary winding 10. The insulator 14 may provide an interference fit with the primary winding 10 and/or may be relatively pliable such that the radially inner surface of the insulator 14 moves and conforms to the radially outer surface of the primary winding 10. The primary winding 10 may comprise a straight portion in the region passing through the toroidal core 8.

The primary winding may comprise a rigid conductor. For example, the portion of the primary winding 10 passing through the toroidal core 8 may be a rigid cylindrical conductor. The rigid conductor may be used as a mechanical support on which the transformer assembly is mounted. The rigid conductor may be mounted to the spectrometer chassis or housing, so as to mount the transformer within chassis or housing. A point on the conductor (on one side of the toroidal core) may be attached to electrical ground, such as by its connection to a grounded chassis or housing (e.g. vacuum housing) of the spectrometer.

As described above, the primary winding 10 is connected to an AC voltage source 6, which determines the differential voltage according to the turns ratio of the transformer 4. One side of this electrical connection may be made via the above-described mechanical support of the transformer. For example, the mechanical support may provide a return path for the current in the primary conductor, via the chassis or vacuum housing, such that current returns to the back to the voltage source 6.

Embodiments are contemplated in which an electrically conductive tube such as a metal tube may be provided through the insulator 14, and the primary winding 10 may pass through the tube and may be shielded thereby. The tube may be grounded. For example, the tube may be connected to a grounded chassis or housing of the spectrometer. The tube may be used as a mechanical support on which the transformer assembly is mounted and/or to mount the transformer within the chassis or housing of the spectrometer.

As will be appreciated, the quadrupole rod set 2 may be located in a vacuum chamber, which is pumped down to below atmospheric pressure. Conventionally, a pair of high voltage feed-throughs are required to connect the RF voltage source V, that is outside of the vacuum chamber, to the quadrupole rod electrodes inside of the vacuum chamber. Also, two high voltage feed-throughs are conventionally required to connect transformers located outside of the vacuum chamber with the quadrupole electrodes. Such high voltage feed-throughs provide a relatively high capacitance and so create a relatively high capacitive load on the RF circuit. Due to the high voltage RF, this capacitance draws a considerable current from the RF supply. In contrast, the compact configuration of the transformer 4 according to embodiments described herein may allow it to be located within the vacuum chamber, for example, so that it can be close to or adjacent to the quadrupole rod set 2. In such embodiments, the electrical connections between the DC and RF voltage sources U,V and the various components of the quadrupole device may be formed via two high voltage feed-throughs, such as of the type required for a conventional quadrupole connection. However, only a low voltage vacuum chamber feed-through is needed for the connection from the AC voltage supply 6 to the transformer primary winding 10. This saves the cost of an additional high voltage vacuum feed-through, but more importantly results in a relatively low capacitive load on the RF and DC circuits. This provides a relatively small current drain on the RF voltage supply and a reduced power dissipation. A conventional vacuum housing and RF voltage source arrangement may therefore be used in the embodiments of the invention.

Embodiments are contemplated in which two transformers 4 of the type described above may be employed to add differential voltages between both pairs of diametrically opposed quadrupole rods. More specifically, a second transformer of the type shown in FIG. 1 may be connected to the quadrupole electrodes that are not connected to the first transformer 4 of FIG. 1. The RF and DC voltage supplies V,U may also be connected to the centre tap 17 on the second transformer.

Although the transformer 4 described herein may be constructed to minimise any unintended imbalance between opposing quadrupole rod electrodes, there may in practice still be slight electrical and mechanical differences between these rod electrodes, which may result in the electric field generated by the quadrupole electrodes being non-ideal. This imbalance may be corrected for by the AC voltage supplied to the primary winding 10 of the transformer 4, as will be described below.

Figure 3:
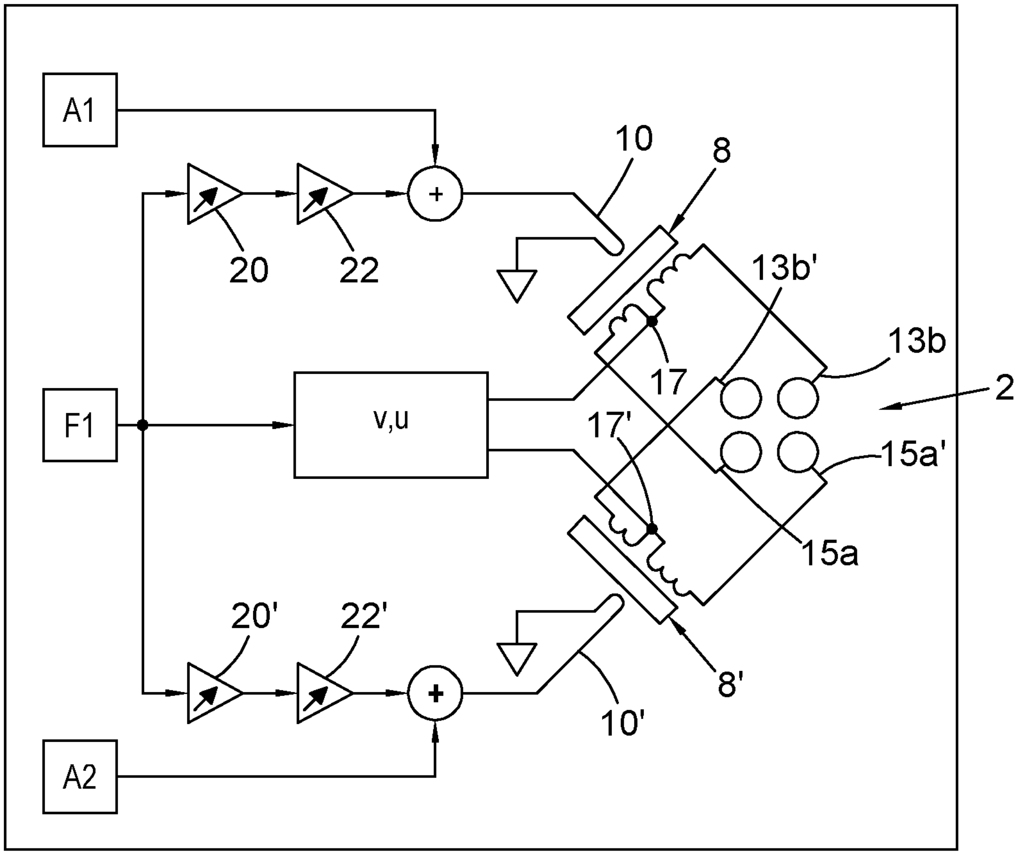
FIG. 3 shows an electrical schematic of an embodiment that automatically adjusts the AC voltages applied to the electrodes.

FIG. 3 shows an embodiment that is similar to that of FIG. 1, except that two transformers 4 of the type described above are employed to add differential voltages between both pairs of diametrically opposed quadrupole rod electrodes 2. More specifically, a second transformer of the type shown in FIG. 1 may be connected to the quadrupole electrodes that are not connected to the first transformer. The RF and DC voltage supplies V,U may also be connected to the centre tap 17' on the second transformer. Differential AC voltages A1,A2 and may be independently added between each pair of opposing rod electrodes, in a similar manner to that described above in relation to FIG. 1.

The embodiment shown in FIG. 3 also includes means for automatically adjusting the AC voltages applied to the electrodes in order to optimise or improve the analytical performance of the quadrupole rod set. As described above, in use, ions that are transmitted by the quadrupole rod set 2 may be detected by a detector. The quadrupole mass analyser may adjust the AC voltages applied to the rod electrodes (i.e. via the primary windings 10,10') based on the peak shape or mass resolution of the ions detected at the detector, or based on detected ion transmission characteristics of the quadrupole rod set 2. The quadrupole mass analyser may adjust the AC voltages applied to the rod electrodes so as to optimise, or otherwise improve, the performance of the quadrupole rod set. For example, the mass analyser may adjust the AC voltages until the peak shape and/or mass resolution and/or transmission characteristics meet one or more predetermined threshold criteria, or until they are optimised. The quadrupole mass analyser may automatically adjust the AC voltages to perform this.

The differential voltage A1 may be summed with another AC voltage and then applied to the primary winding 10. For example, the differential voltage A1 may be summed with an RF voltage that is derived from the frequency reference signal F1 of the main RF voltage supply V. The derived RF voltage may be a small fraction of the frequency reference signal F1. The phase and/or amplitude of the derived RF voltage may be varied with time by a phase shifter 20 and/or amplifier 22 respectively, whilst detecting the ions transmitted by the quadrupole rod set 2. One or more processor in the mass analyser may then automatically control the phase and/or amplitude of the derived RF voltage that is applied to the primary winding 10 so as to select the phase and/or amplitude that provides a peak shape and/or mass resolution and/or transmission characteristic that meets one or more predetermined threshold criteria, or is optimised. The gain adjustment may be adjustable through zero to include both in phase and anti-phase outputs. These adjustments may be made by electronic means, using for example a phase locked loop, or digital waveform generation techniques.

A corresponding process to that described above for applying a sum of the differential voltage A1 and the derived RF voltage to the primary winding 10 may also be used to apply a sum of the differential voltage A2 and the derived RF voltage to the primary winding 10'. The mass analyser may vary the phase and/or amplitude of the derived RF voltage that is summed with differential voltage A1 and select the values that achieve the predetermined threshold criteria or optimised values, and then vary the phase and/or amplitude of the derived RF voltage that is summed with differential voltage A2 so as to select the values that achieve the predetermined threshold criteria or optimised values. Alternatively, these processes may occur concurrently.

Although embodiments are contemplated in which the AC voltage that is summed with each differential voltage A1,A2 is obtained directly from the frequency reference F1, it is alternatively contemplated that a proportion of the main RF voltage V supplied to the quadrupole electrodes may be fed back and added to differential voltages A1,A2. Again, the amplitude and/or the phase relationship of the RF voltage that is fed back may be varied as described above. Alternatively, a sample of the RF current flowing between the RF and DC circuits and the transformer centre tapped secondary winding may be used to create a voltage which is added to differential voltages A1 and A2. Again, the amplitude and/or the phase relationship of the created voltage may be varied as described above.

Embodiments described herein provide a compact, low loss, high voltage RF isolation transformer, suitable for use in high Q-factor tuned circuits.

Although the present invention has been described with reference to various embodiments, it will be understood by those skilled in the art that various changes in form and detail may be made without departing from the scope of the invention as set forth in the accompanying claims.

For example, the techniques described are independent of the means used to generate the main RF and DC voltages applied to the electrodes. They are therefore applicable to RF coils that are driven via a central break in the winding, or from a separate primary winding.

Embodiments have been described in which the quadrupole rod set and transformer are mounted in a vacuum chamber. However, it is contemplated that one or both of the transformer and quadrupole rod set may not be mounted in a vacuum chamber.

Although embodiments have been described with reference to balancing or adjusting the main RF voltage applied to opposing rod electrodes, for example to counteract imperfect fields, the same arrangements may be used to add an AC (e.g. dipole) excitation waveform to the electrodes of a different frequency and/or phase to the main RF voltage. This excitation waveform can be used to mass selectively excite ions as they traverse the quadrupole mass filter.

Although embodiments of quadrupole mass filters have been described above, the techniques described herein may alternatively be applied to other devices, such as 3D or linear ion traps. For example, a transformer as described may be used to apply an additional AC waveform to a 3D or linear ion trap to either balance or adjust the main RF ion confinement voltage or add an auxiliary ion excitation waveform to the ion trap such as for mass selectively ejecting ions.

Although a quadrupole rod set of electrodes has been described herein, it is contemplated that multipole rod sets having other that four electrodes may be used.

It is conceivable that the transformer may power a circuit floating at the quadrupole RF and DC voltage, with respect to ground. Such a circuit may also have an optical link to facilitate signal or data transfer. Additionally, this technique would allow a second DC voltage, or low frequency AC voltage, to be applied differentially between diametrically opposed quadrupole rods. For example, in its simplest form the AC waveform appearing across the secondary winding may be the same as that applied to the primary winding, only modified by the turns ratio of the transformer. However, if it were required to supply a different waveform, such as one outside the frequency range of the transformer this could be achieved by creating the waveform locally to the quadrupole using a circuit that is floated at the RF and DC voltage. The control to such a circuit maybe optical, overcoming the problem of its electrical isolation. However, the floating circuit requires a power supply, and the transformer described herein may be used to supply this power. The primary winding may be supplied with an AC voltage, within the frequency range of the transformer, and the resulting secondary AC voltage generated may be rectified to provide power to supply rails of the floating circuit.

The invention claimed is:

1. An ion-optical device comprising:
- a plurality of electrodes;
- a first AC voltage supply; and
- a first transformer having:
  - a toroidal core;
  - a primary winding connected to the AC voltage supply and passing through the aperture within the toroidal core, wherein the primary winding is not wound around the toroidal core; and
  - at least one secondary winding wound around the toroidal core and electrically connected to multiple ones of said plurality of electrodes.

2. The device of claim 1, comprising an electrical insulator arranged within the aperture of the toroidal core in the space between the primary and secondary windings.

3. The device of claim 2, wherein the insulator has an elongated tubular shape, such as a cylindrical shape.

4. The device of claim 2, wherein the insulator extends outwards from either side of the toroidal core.

5. The device of claim 2, wherein the radially outer surface of the insulator physically contacts the radially inner sides of the secondary windings; and/or wherein the outer surface of the primary winding is in physical contact with the inner surface of the insulator.

6. The device of claim 2, wherein the insulator is formed of a pliable material so that the radially outer surface of the insulator moves and conforms to the radially inner surface of the secondary windings; and/or so that the radially inner surface of the insulator moves and conforms to the radially outer surface of the primary winding.

7. The device of claim 1, comprising a second AC voltage supply for supplying a second AC voltage to said plurality of electrodes.

8. The device of claim 7, wherein the first AC voltage supply is configured to apply a first AC voltage to the primary winding that is phase locked with the second AC voltage.

9. The device of claim 1, wherein the plurality of electrodes comprises a quadrupole or other multipole rod set of electrodes, and wherein different ends of the secondary winding are connected to different electrodes of a first pair of opposing rod electrodes.

10. The device of claim 1, wherein the ion optical device is a quadrupole mass analyser, quadrupole mass filter, 3D ion trap, or linear ion trap.

11. The device of claim 1, wherein the at least one secondary winding comprises two wires that have together been bi-filar wound around the toroidal core from starting ends of the wires to finishing ends of the wires;
- wherein the starting end of a first of the wires is connected to one of said plurality of electrodes and the finishing end of a second of the wires is connected to another of said plurality of electrodes;
- wherein the finishing end of the first wire is connected to the starting end of the second wire, thereby forming a single centre tapped secondary winding; and wherein a second AC voltage supply is connected between the centre tap of the secondary winding and electrodes of said plurality of electrodes, for supplying a second AC or RF voltage between said single centre tapped secondary winding and the electrodes.

12. The device of claim 11, wherein the length of the first wire between its starting end and the toroidal core is the same as the length of the second wire between its finishing end and the toroidal core.

13. The device of claim 11, comprising an ion detector arranged to receive ions guided by the plurality of electrodes and a voltage controller configured to adjust the AC voltage applied to the primary winding by the first AC voltage supply based on the ion signal detected at the ion detector.

14. The device of claim 13, wherein the first AC voltage supply is configured to sum one AC voltage with another AC voltage and then apply the summed voltage to the primary winding; and wherein the voltage controller is configured to adjust the AC voltage applied to the primary winding by varying the phase and/or amplitude of said another voltage.

15. The device of claim 11, comprising a second transformer having: a toroidal core; a primary winding connected to an AC voltage supply and passing through the aperture within the toroidal core; and at least one secondary winding wound around the toroidal core and connected to electrodes in said plurality of electrodes other than those connected to the windings of the first transformer.

16. An ion-optical device comprising:

a plurality of electrodes;

a first AC voltage supply;

a transformer having a core, a primary winding, and at least one secondary winding;

an ion detector arranged to receive ions guided by the plurality of electrodes; and a voltage controller configured to automatically adjust the AC voltage applied to the primary winding by the first AC voltage supply based on the ion signal detected at the ion detector.

17. A transformer for applying a voltage to electrodes of an ion optical device or to an electrical circuit, the transformer comprising:

a toroidal core;

a primary winding for connection to an AC voltage supply and passing through the aperture within the toroidal core; and at least one secondary winding wound around the toroidal core for connection to the electrodes;

wherein:

(i) the primary winding comprises a substantially straight portion passing along a central axis of the aperture in the toroidal core, wherein the transformer comprises an electrical insulator arranged within the aperture of the toroidal core in the space between the primary winding and the secondary windings, and wherein the insulator extends outwards from either side of the toroidal core; or (ii) the transformer comprises an insulator arranged within the aperture of the toroidal core in the space between the primary and secondary windings, wherein the radially outer surface of the insulator physically contacts the radially inner sides of the secondary windings; or (iii) wherein the at least one secondary winding comprises two wires that have together been bi-filar wound around the toroidal core from starting ends of the wires to finishing ends of the wires, wherein the finishing end of the first wire is connected to the starting end of the second wire, thereby forming a single centre tapped secondary winding.

18. A mass spectrometer comprising an ion optical device or transformer as claimed in claim 1.

* * * * *